US011813531B2

(12) United States Patent
Chan et al.

(10) Patent No.: US 11,813,531 B2
(45) Date of Patent: *Nov. 14, 2023

(54) TECHNIQUES FOR ADAPTING VIDEO GAME ASSETS BASED ON AN AGGREGATED MEASURE OF SOCIAL MEDIA INTERACTION AND RELATED SYSTEMS AND METHODS

(71) Applicant: Harmonix Music Systems, Inc., Boston, MA (US)

(72) Inventors: Brian Seong-chi Chan, Cambridge, MA (US); Daniel Aaron Sproul, Jamaica Plain, MA (US); Michael Verrette, Medford, MA (US); Ryan William Challinor, Cambridge, MA (US)

(73) Assignee: Harmonix Music Systems, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,602

(22) Filed: Jul. 6, 2022

(65) Prior Publication Data

US 2023/0058656 A1 Feb. 23, 2023

Related U.S. Application Data

(63) Continuation of application No. 16/720,944, filed on Dec. 19, 2019, now Pat. No. 11,383,170.

(Continued)

(51) Int. Cl.
*A63F 9/24* (2006.01)
*A63F 11/00* (2006.01)
(Continued)

(52) U.S. Cl.
CPC .............. *A63F 13/79* (2014.09); *A63F 13/35* (2014.09); *A63F 13/58* (2014.09); *H04L 51/10* (2013.01); *H04L 51/52* (2022.05)

(58) Field of Classification Search
CPC ... G07F 17/32; G07F 17/3211; G07F 17/3214
(Continued)

(56) References Cited

U.S. PATENT DOCUMENTS 9,597,586 B1 3/2017 Wiklem et al.
11,383,170 B2 7/2022 Chan et al.
(Continued)

OTHER PUBLICATIONS

International Search Report and Written Opinion dated Mar. 19, 2020, in connection with International Application No. PCT/US2019/067833.

(Continued)

*Primary Examiner* — Adetokunbo O Torimiro
(74) *Attorney, Agent, or Firm* — Wolf, Greenfield & Sacks, P.C.

(57) ABSTRACT

Embodiments relate to adapting assets for a video game based on social media interaction. Instructions are sent to a computing device associated with a social media platform to create a social media post comprising at least one piece of multimedia content relating to a video game, the at least one piece of multimedia content produced by a player of the video game. Data is received from the computing device indicative of one or more indications of user interaction with the social media post. A score is determined for the player based at least in part on the received data indicative of the one or more indications of user interaction relating to the social media post. One or more assets of the video game are adapted for the player based at least in part on the determined score for the player.

20 Claims, 8 Drawing Sheets

Related U.S. Application Data

(60) Provisional application No. 62/784,195, filed on Dec. 21, 2018.

(51) Int. Cl.
  *G06F 13/00* (2006.01)
  *G06F 17/00* (2019.01)
  *A63F 13/79* (2014.01)
  *A63F 13/58* (2014.01)
  *A63F 13/35* (2014.01)
  *H04L 51/10* (2022.01)
  *H04L 51/52* (2022.01)

(58) Field of Classification Search
  USPC .............................. 463/1, 20, 22, 25, 39, 42
  See application file for complete search history.

(56) References Cited

U.S. PATENT DOCUMENTS

| | | |
|---|---|---|
| 2010/0062840 A1 | 3/2010 | Herrmann |
| 2014/0094241 A1 | 4/2014 | Guinn et al. |
| 2014/0187314 A1 | 7/2014 | Perry et al. |
| 2017/0095471 A1 | 4/2017 | Ahmed et al. |
| 2017/0095741 A1 | 4/2017 | Perry |
| 2019/0299103 A1 | 10/2019 | Lee |
| 2020/0197817 A1 | 6/2020 | Chan et al. |

OTHER PUBLICATIONS

International Preliminary Report on Patentability dated Jul. 1, 2021, in connection with International Application No. PCT/US2019/067833.

Extended European Search Report dated Jul. 6, 2022, in connection with European Application No. 19900080.3.

| 310 Social Media Platform | 320 Type of User Interaction | 330 Score per Instance |
|---|---|---|
| Facebook® | Like | +10 |
| | Share | +50 |
| Twitter® | Like | +5 |
| | Retweet | +25 |
| | Comment | +15 |
| ... | ... | ... |

TECHNIQUES FOR ADAPTING VIDEO GAME ASSETS BASED ON AN AGGREGATED MEASURE OF SOCIAL MEDIA INTERACTION AND RELATED SYSTEMS AND METHODS

RELATED APPLICATIONS

This Application is a continuation of and claims priority under 35 U.S.C. § 120 to U.S. patent application Ser. No. 16/720,944, filed on Dec. 19, 2019, entitled TECHNIQUES FOR ADAPTING VIDEO GAME ASSETS BASED ON AN AGGREGATED MEASURE OF SOCIAL MEDIA INTERACTION AND RELATED SYSTEMS AND METHODS, which is a non-provisional that claims priority under 35 U.S.C. § 119(e) to U.S. Provisional Application Ser. No. 62/784,195, filed on Dec. 21, 2018, entitled TECHNIQUES FOR ADAPTING VIDEO GAME ASSETS BASED ON AN AGGREGATED MEASURE OF SOCIAL MEDIA INTERACTION AND RELATED SYSTEMS AND METHODS, which is herein incorporated by reference in its entirety.

BACKGROUND

Social media platforms represent a popular and convenient avenue for users to share content with other users. Many social media platforms allow users to interact with content shared by others, whether by showing approval (e.g., through actions often referred to as a "like," a "thumbs up," etc.), showing disapproval (e.g., a "thumb down," etc.) and/or further circulating the content on social media (e.g., "sharing,"), which may include circulation on the same social media platform and/or on a different platform.

Some video games may provide options for sharing content through social media. In particular, some video games may share content relating to some aspect of the game, such as a video of gameplay or an indication of a high score, to social media.

SUMMARY

The techniques described herein, in some embodiments, relate to adapting video game assets based on social media interactions with posts that are posted by the player to one or more social media platforms. The player can post data (e.g., multimedia data) related to the player's gameplay of the video game in the social media posts, and the techniques can modify one or more video game assets of the video game based on the social media interactions.

Some embodiments relate to a computer-implemented method of adapting assets for a video game based on social media interaction. The method includes using at least one computer hardware processor to perform sending, to a computing device associated with a social media platform, instructions to create a social media post comprising at least one piece of multimedia content relating to a video game, the at least one piece of multimedia content produced by a player of the video game, receiving, from the computing device, data indicative of one or more indications of user interaction with the social media post, determining a score for the player based at least in part on the received data indicative of the one or more indications of user interaction relating to the social media post, and adapting one or more assets of the video game for the player based at least in part on the determined score for the player.

In some examples, adapting the one or more assets for the video game includes generating, based on the received data indicative of the one or more indications of user interaction relating to the social media post, a request to modify an account associated with the player of the video game to adapt the one or more assets for the video game based on the score, and transmitting the request to one or more second computing devices associated with the video game. The one or more second computing devices associated with the video game can include a video game server providing one or more aspects of the video game.

In some examples, adapting the one or more assets for the video game includes modifying an account associated with the player to adapt the one or more assets for the video game.

In some examples, the method includes receiving, from the computing device associated with the social media platform, second data indicative of one or more second indications of user interaction with the social media post, and determining the score for the player includes determining the score for the player based at least in part on: the received data indicative of the one or more indications of user interaction relating to the social media post; and the received second data indicative of the one or more second indications of user interaction relating to the social media post.

In some examples, the method includes sending, to a second computing device associated with a second social media platform, second instructions to create a second social media post comprising the at least one piece of multimedia content relating to the video game, and receiving, from the second computing device, second data indicative of one or more indications of user interaction with the second social media post, wherein determining the score for the player includes determining the score for the player based at least in part on: the received data indicative of the one or more indications of user interaction relating to the social media post, and the received second data indicative of one or more indications of user interaction with the second social media post.

In some examples, sending the instructions to create a social media post including the at least one piece of multimedia content relating to a video game includes sending one or more of: the multimedia content, wherein the multimedia content comprises gameplay of the video game performed by the player; data determined based on the player's gameplay of the video game; data determined based on the multimedia content; or some combination thereof.

In some examples, adapting one or more assets for the video game includes increasing the player's progress with the video game, increasing a score of the player for the video game, unlocking an in-game item for the player for the video game, increasing an amount of an in-game currency for the player for the video game, or some combination thereof.

Some embodiments relate to an apparatus for adapting assets for a video game based on social media interaction. The apparatus includes a processor in communication with a memory. The processor is configured to execute instructions stored in the memory that cause the processor to perform sending, to a computing device associated with a social media platform, instructions to create a social media post comprising at least one piece of multimedia content relating to a video game, the at least one piece of multimedia content produced by a player of the video game, receiving, from the computing device, data indicative of one or more indications of user interaction with the social media post, determining a score for the player based at least in part on the received data indicative of the one or more indications of user interaction relating to the social media post, and adapting one or more assets of the video game for the player based at least in part on the determined score for the player.

In some examples, adapting the one or more assets for the video game includes generating, based on the received data indicative of the one or more indications of user interaction relating to the social media post, a request to modify an account associated with the player of the video game to adapt the one or more assets for the video game based on the score, and transmitting the request to one or more second computing devices associated with the video game.

In some examples, adapting the one or more assets for the video game includes modifying an account associated with the player to adapt the one or more assets for the video game.

In some examples, the processor is configured to execute instructions stored in the memory that cause the processor to perform receiving, from the computing device associated with the social media platform, second data indicative of one or more second indications of user interaction with the social media post, wherein determining the score for the player includes determining the score for the player based at least in part on the received data indicative of the one or more indications of user interaction relating to the social media post, and the received second data indicative of the one or more second indications of user interaction relating to the social media post.

In some examples, the processor is configured to execute instructions stored in the memory that cause the processor to perform sending, to a second computing device associated with a second social media platform, second instructions to create a second social media post comprising the at least one piece of multimedia content relating to the video game, and receiving, from the second computing device, second data indicative of one or more indications of user interaction with the second social media post, wherein determining the score for the player comprises determining the score for the player based at least in part on the received data indicative of the one or more indications of user interaction relating to the social media post, and the received second data indicative of one or more indications of user interaction with the second social media post.

In some examples, sending the instructions to create a social media post comprising the at least one piece of multimedia content relating to a video game comprises sending one or more of: the multimedia content, wherein the multimedia content comprises gameplay of the video game performed by the player; data determined based on the player's gameplay of the video game; data determined based on the multimedia content; or some combination thereof.

In some examples, adapting one or more assets for the video game includes increasing the player's progress with the video game, increasing a score of the player for the video game, unlocking an in-game item for the player for the video game, increasing an amount of an in-game currency for the player for the video game, or some combination thereof.

Some embodiments relate to at least one non-transitory computer-readable storage medium storing processor-executable instructions that, when executed by at least one computer hardware processor, cause the at least one computer hardware processor to perform the acts of sending, to a computing device associated with a social media platform, instructions to create a social media post comprising at least one piece of multimedia content relating to a video game, the at least one piece of multimedia content produced by a player of the video game, receiving, from the computing device, data indicative of one or more indications of user interaction with the social media post, determining a score for the player based at least in part on the received data indicative of the one or more indications of user interaction relating to the social media post, and adapting one or more assets of the video game for the player based at least in part on the determined score for the player.

In some examples, adapting the one or more assets for the video game includes generating, based on the received data indicative of the one or more indications of user interaction relating to the social media post, a request to modify an account associated with the player of the video game to adapt the one or more assets for the video game based on the score, and transmitting the request to one or more second computing devices associated with the video game.

In some examples, adapting the one or more assets for the video game includes modifying an account associated with the player to adapt the one or more assets for the video game.

In some examples, the instructions further cause the at least one computer hardware processor to perform the acts of receiving, from the computing device associated with the social media platform, second data indicative of one or more second indications of user interaction with the social media post, wherein determining the score for the player comprises determining the score for the player based at least in part on the received data indicative of the one or more indications of user interaction relating to the social media post, and the received second data indicative of the one or more second indications of user interaction relating to the social media post.

In some examples, the instructions further cause the at least one computer hardware processor to perform the acts of sending, to a second computing device associated with a second social media platform, second instructions to create a second social media post comprising the at least one piece of multimedia content relating to the video game, and receiving, from the second computing device, second data indicative of one or more indications of user interaction with the second social media post, wherein determining the score for the player comprises determining the score for the player based at least in part on: the received data indicative of the one or more indications of user interaction relating to the social media post, and the received second data indicative of one or more indications of user interaction with the second social media post.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 3 depicts an illustrative lookup table for use in determining a score for a user based on indications of user interactions with social media posts, according to some embodiments;

DETAILED DESCRIPTION

Figure 1:
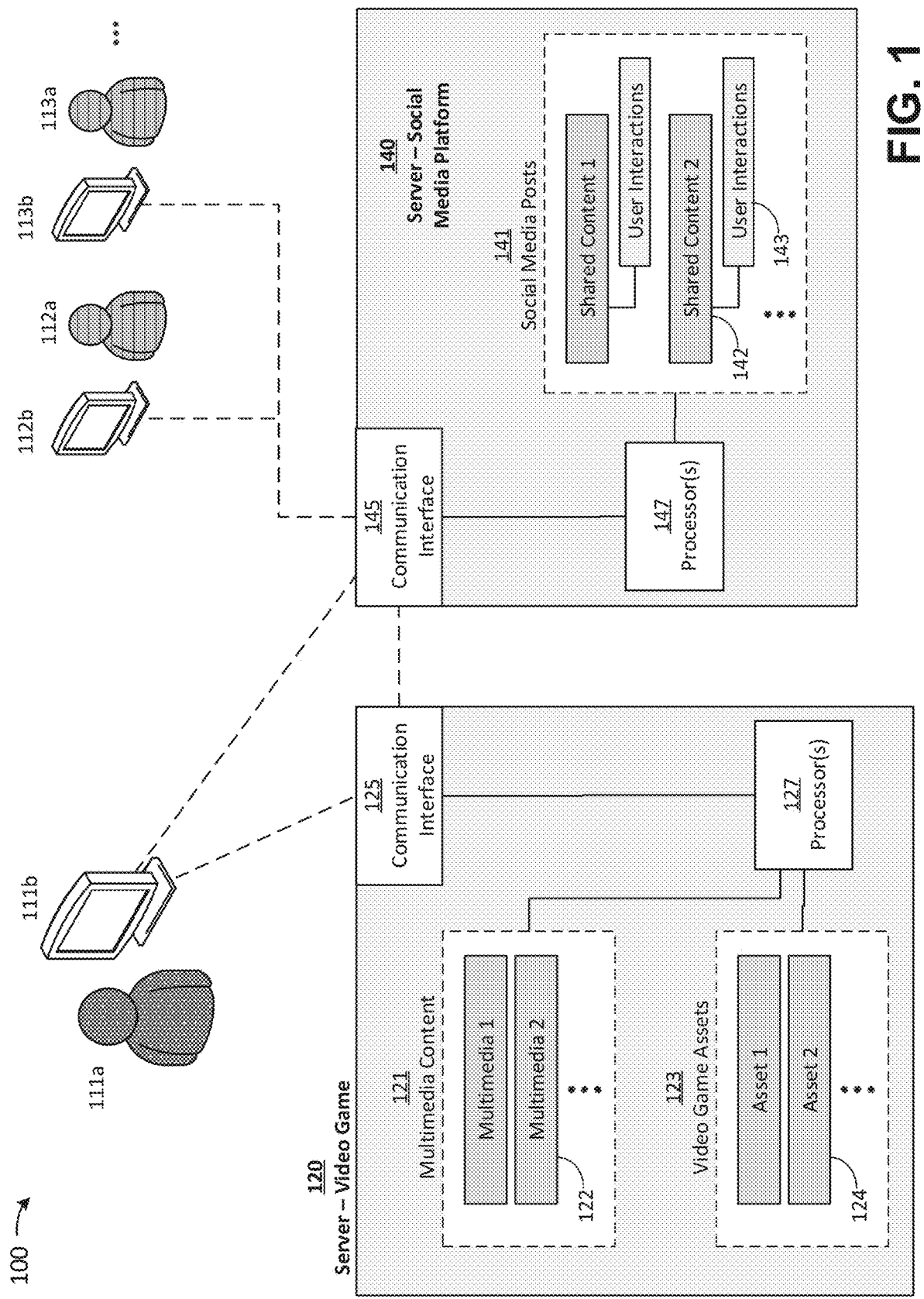
FIG. 1 illustrates a system for adapting video game assets based on an aggregated measure of social media interaction, according to some embodiments.

As discussed above, some video games may be configured to share content to social media platforms. For instance, a user playing a video game may provide authentication information for one or more social media platforms to the video game, thereby allowing the video game to automatically share content on said platforms on behalf of the user. As one example, a video and/or audio capture of the user playing the video game may be shared to a social media platform automatically, upon request by the user or manually by the user. In some cases, a video and/or audio capture of a user playing a video game may be captured by a user by means other than the video game (e.g., by locally executed video capture software) and manually uploaded to a social media platform by the user. In each of the above cases, a result is that multimedia associated with a video game is shared via a social media platform. Sharing with a social media platform can generally include generally uploading, storing, modifying, and/or publishing content on the social media platform that is viewable by others in any suitable way. These and other terms used or discussed herein are used for illustrative purposes, and are not intended to be limiting.

The inventors have recognized and appreciated that existing techniques in which video games share content to social media platforms are limited. In particular, these techniques are one-directional: while content may be produced inside or outside of the video game and provided to one or more social media platforms, there may be no subsequent interactions with the video game as a result of producing this content. The inventors have recognized and appreciated techniques for adapting video game assets based on user interactions from one or more social media platforms. In some embodiments, the techniques provide for adapting video game assets by aggregating indications of user interaction from amongst a plurality of social media platforms. These techniques can allow, for example, treatment of social media interactions as a form of "currency" that can drive in-game mechanics, can further allow different types of social media interactions on different social media platforms to have individualized weightings in said currency, and/or the like. As discussed further herein, the techniques can be used to adapt any type of video game asset, including any stored data that may be accessed by the video game, used by the video game, and/or which may affect gameplay. The video game assets can include not only particular items within the video game, but also may include any user-specific data whose values affects any aspect(s) of gameplay.

As one non-limiting example, a user playing a video game may produce a piece of multimedia content relating to the game, such as a video recording of the user's gameplay. Through an interface provided by the video game (and/or otherwise), the user may create social media posts on one or more social media platforms in which the multimedia content is shared and/or information determined based on the user's gameplay and/or the multimedia content. Subsequently, other users may interact with the social media post(s) by liking the post, sharing it, and/or performing other interactions facilitated by the social media platforms. The number of such interactions may be used by the video game (e.g., as a form of currency) to drive in-game mechanics. In some cases, the types of interactions (e.g., a "like" versus a "share" interaction) and/or the social media platform through which the interactions occur may in part determine how the in-game mechanics are driven by the interactions.

Following below are more detailed descriptions of various concepts related to, and embodiments of, techniques for adapting video game assets based on an aggregated measure of social media interaction. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates a system suitable for practicing techniques described herein, according to some embodiments. In the example of FIG. 1, system 100 includes a user 111*a* who may access a computing device 111*b* on which a video game client may be executed. The video game client executing on computing device 111*b* may communicate with server 120 via communication interface 125. The server 120 may communicate with servers of one or more social media platforms, of which server 140 is one example, to create one or more social media posts featuring shared content relating to the video game. Users 112*a*, 113*a*, . . . may interact with any one or more of these social media posts and results of such interactions may be stored on the server 140. Subsequently, the server 120 may obtain indications of the user interactions from the server 140, and processor(s) 127 may adapt video game assets 123 based on the number (and, in some cases, the types) of the interactions with the social media post.

In some embodiments, execution of various components of the video game and/or social media platform may be divided up between computing device 111*b*, server 120, server 140, and/or any other devices in any suitable manner, including with server 120 and/or server 140 providing the social media functionality as discussed herein. For instance, in some embodiments, primary gameplay aspects of the video game (e.g., rendering of graphics and audio, generation of gameplay state, etc.) may be executed on the computing device 111*b* and the server 120 may be used and/or provided simply for the purposes of social media interactions. In some embodiments, computing device 111*b* may render graphics and/or audio locally but obtain a generated gameplay state from the server 120 and/or some other server (e.g., processor(s) 127 may generate said gameplay state in whole or in part).

In some embodiments, components of the video game executing on computing device 111*b* may be configured to provide authentication information associated with user 111*a* to the server 120 to gain access to the social media functionality of the server (in addition to any components of the video game being executed on the server 120).

According to some embodiments, computing device 111*b* may comprise any suitable computing device configured to execute one or more components of a video game. Illustrative computing devices may include a desktop computer, a mobile device, a tablet, or a gaming console. The computing device 111b may be any suitable system, including a desktop computer, a gaming console, a tablet, a mobile device, or the like. In some embodiments, the computing device 111b may be a dedicated game console, e.g., PLAYSTATION®3, PLAYSTATION®4, or PLAYSTATION® VITA manufactured by Sony Computer Entertainment, Inc.; WII™, WII U™, NINTENDO 2DS™, NINTENDO 3DS™, or NINTENDO SWITCH™ manufactured by Nintendo Co., Ltd.; or XBOX®, XBOX 360®, or XBOX ONE® manufactured by Microsoft Corp. In some embodiments, the computing device 111b may be a computer configured to run a virtual reality (VR) platform, such as those provided by Oculus, HTC, Sony, and/or the like, and discussed further herein. In other embodiments, the computing device 111b can be a general purpose desktop or laptop computer. In other embodiments, the computing device 111b can be a server connected to a computer network (e.g., including server 120 and/or server 140). In other embodiments, the computing device 111b can be user equipment. The user equipment can communicate with one or more radio access networks and/or with wired communication networks. The user equipment can be a cellular phone. The user equipment can also be a smartphone providing services such as word processing, web browsing, gaming, and/or the like. The user equipment can also be a tablet computer providing network access and most of the services provided by a smartphone. The user equipment can operate using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, spatial positioning information (e.g., roll, pitch, yaw, etc.), profile information, or other location information.

According to some embodiments, server 120 may be configured to receive multimedia content from the computing device 111b and store said multimedia content 121 on the server (e.g., multimedia item 122). Such multimedia content may be generated by the computing device 111b and transmitted to the server 120. For instance, computing device 111b may capture video and/or audio of gameplay of the video game and upload one or more files representing said captured video and/or audio to the server 120. Additionally, or alternatively, user 111a may produce multimedia content on computing device 111b (e.g., by typing text) and transmit or upload the produced content to the server 120. Transmission of multimedia content from the computing device 111b to the server 120 may be initiated automatically by the video game executing on the computing device, in response to user 111a providing input requesting that such transmission take place, and/or the like.

In some embodiments, computing device 111b may capture video and/or audio of gameplay of the video game and upload one or more files representing said captured video and/or audio directly to the social media platform 140 (e.g., via the communication link between computing device 111b and social media platform 140 shown in FIG. 1). In such cases, the user may provide information that indicates that the multimedia content relates to a particular video game, thereby allowing server 120 to recognize such content as being related to the game. For example, a user could tag (e.g., hashtag) or otherwise mark a social media post to indicate a video game associated with the uploaded multimedia content. In some embodiments, a social media post can be associated with the game using an identifier (ID). For example, when the computing device 111b (e.g., a game client) posts a video to social media platform 140, the social media server can include an ID (e.g., a unique ID) for the uploaded multimedia content as part of a reply to the computing device 111b. The computing device 111b can report the ID to the game server 120, and the game server 120 can keep track of which social media posts (e.g., by ID) are associated with the game.

According to some embodiments, server 120 may generate multimedia content and store said multimedia content 121 on the server. For instance, in embodiments in which server 120 executes a portion of the video game, processor(s) 127 may generate multimedia content and store said content 121 on the server.

As referred to herein, multimedia content may comprise any suitable combination of content, such as text, video, images and/or audio content. As also discussed herein, other content can be generated, including content based on gameplay and/or content generated based on the multimedia content.

As discussed above, in the example of FIG. 1, server 120 may be configured to communicate with servers of one or more social media platforms to create one or more social media posts featuring shared content relating to the video game. Such communication may comprise any suitable messages configured to request the social media platform to create the one or more social media posts, and can include information relating to the content of said one or more social media posts.

According to some embodiments, server 120 may be configured to generate request messages according to an Application Programming Interface (API) of a selected social media platform, wherein said request messages are configured to cause the social media platform to perform a particular action. For instance, processor(s) 127 of server 120 may be configured to generate one or more request messages to an API of the social media platform executed by server 140 to request that the platform create a social media post for user 111a. Details of such a post may be specified by the API call and may include multimedia from amongst multimedia content 121 and/or may include links to such multimedia content. In some embodiments, request messages generated by the processor(s) 127 may comprise one or more messages in which authentication information for the user 111a and the social media platform are provided so that the server 120 may initiate a social media post on behalf of the user 111a.

In the example of FIG. 1, server 120 may be configured to transmit one or more items of multimedia content 121 (e.g., multimedia 122) to the server 140 as part of the server 120 requesting that the server 140 create a social media post for the user 111a. For instance, the multimedia item may be an image that is uploaded to the server 140 as part of a request to create a social media post comprising the image. Additionally or alternatively to transmitting the multimedia content, server 120 may be configured to transmit a suitable link to the multimedia content. For instance, server 120 may generate a URL to an item of the multimedia content 121 stored on the server 120 and transmit the URL to the server 140 as part of the request to create a social media post so that the social media post contains a link to the multimedia content. It will be appreciated that, in some instances, server 120 may also transfer multimedia to another server not shown in FIG. 1 and provide a link to the multimedia content on that server (e.g., through the use of a content delivery network, and/or the like), as this approach is not limited by the particular location at which the content is stored.

In the example of FIG. 1, server 140 is configured to store social media posts 141 which comprise shared content (e.g., content 142) and have associated user interactions produced by users 112a, 113a, etc. In some embodiments, server 140 may generate a web page through which users 112a, 113a, etc. may view the social media posts and interact with the posts. Social media posts are generally referred to herein for illustrative purposes as comprising "shared content" rather than comprising "multimedia" since, as discussed above, a social media post may comprise a link to multimedia and/or may directly contain the multimedia. The shared content of a social media post 141 therefore represents any content, including multimedia content, that may be accessed through the server 140, whether the content is stored on the server 140 itself or whether it is stored elsewhere and the server 140 stores a link to the content.

User interactions associated with the shared content stored by server 140 may comprise any one or more types of user interaction produced by users. For instance, a social media platform may provide multiple ways in which a user may interact with a social media post, and the user interactions stored by the server 140 may comprise indications of the number of each of the different types of interactions. As one example, a social media platform may allow users to indicate they approve of a social media post and may also allow users to share the post with their own social network. As a result, the user interactions stored by server 140 in association with a social media post comprising shared content may include an indication of how many times each of these two types of user interactions occurred with respect to the post.

According to some embodiments, user interactions with a social media post may include indications of approval (e.g., actions often referred to as a "like," a "thumbs up," an "upvote," and/or other similar actions or interactions), indications of disapproval (e.g., actions often referred to as a "dislike," a "thumbs down," a "downvote," and/or other similar actions or interactions), promulgation of the social media post (e.g., actions often referred to as sharing, "retweeting," and/or other similar actions or interactions), views of the social media post (e.g., a number of impressions, a number of plays of a video, a number of views of a text-based post), or combinations thereof. In general, user interactions with a social media post as described herein may include any user interaction with the social media platform, including any user interaction for which the social media platform may create a metric based on the user interactions, such as a metric tracking the number of times such interactions occur. Moreover, indications of user interactions may include indications of any type of such user interactions.

In some cases, server 140 may infer indications of user interactions with a social media post from actions performed directly by users. For instance, in one social media platform users may interact with a social media post by submitting an upvote or a downvote, and server 140 may determine a fraction of users who upvoted and store said fraction as an indication of user interactions associated with the social media post.

As discussed above, in the example of FIG. 1, server 120 may be configured to obtain indications of the user interactions from the server 140. According to some embodiments, server 120 may be configured to generate request messages according to an API of a selected social media platform, wherein said request messages are configured to request indications of the user interactions stored by server 140 that are associated with a particular social media post for a user that was previously created through interaction of the server 120 with the server 140. In some cases, indications of the user interactions with a social media post may be publicly available (e.g., may be available on a public web page) and in such cases, server 120 may be configured to obtain said indications from the publicly accessible location (e.g., by parsing a web page) rather than by making an API call to the server 140. In some embodiments, the server 140 may be configured to send data indicative of user interactions to the server 120, such as periodically sending the data, sending the data based on a trigger, and/or the like.

According to some embodiments, server 120 requesting indications of user interactions from server 140 may be triggered by one or more messages received from computing device 111b (e.g., user 111a provides input to the computing device 111b requesting that the server obtain said indications). In some embodiments, server 120 may request indications of user interactions from server 140 for a particular social media post multiple times. In such cases, prior results of such requests may be stored by server 120 and later accessed as discussed below. In some embodiments, server 120 may request indications of user interactions from server 140 automatically (e.g., periodically, at certain times, etc.).

As discussed above, processor(s) 127 of server 120 may determine how to adapt in-game mechanics of a video game based on a number of interactions with a social media post. In the example of FIG. 1, processor(s) 127 may be configured to adapt one or more of video game assets 123 (e.g., asset 124), which represent data associated with the video game. For instance, video game assets 123 may include data regarding the user 111a's progress within the game (e.g., flags indicating whether portions of the game have been completed and/or values indicating a degree to which portions of the game have been completed), an in-game score (e.g., experience points (XP)), data indicating whether certain in-game items have been unlocked (e.g., skins, songs, weapons, characters, abilities, and/or other in-game items), data indicating an amount of an in-game currency (e.g., in-game money), or combinations thereof.

According to some embodiments, processor(s) 127 of server 120 may be configured to determine a score based on indications of user interactions received from server 140 and adapt video game assets 123 based on the determined score. In some cases, indications of user interactions relating to a particular social media post may have been previously received and stored by server 120 and, in such cases, determining the score may depend both on the previously received indications of user interactions in addition to newly-received indications of user interactions. For example, server 120 may have previously received and stored indications that a social media post had previously received 55 "likes," and may subsequently receive indications that the social media post has now received 143 "likes." Determining the score may, in some embodiments, be based upon the difference between the two indications (88 "likes" in this example).

According to some embodiments, processor(s) 127 of server 120 may be configured to determine a score for the user 111a based at least in part on a number of instances of a user interaction represented by the received indications of user interactions. A score may, in some cases, be determined based on a linear relationship between the number of instances of the user interaction and the resulting score, e.g., score=(number of instances)×A, where A is a constant value. Other, non-linear relationships may also be applied, for example, relationships in which the determined score grows more slowly with additional instances as the number of instances increase (e.g., score=(number of instances)$^P$×A, where P is a number between 0 and 1) and/or relationships in which the determined score grows faster (e.g., score= (number of instances)$^P$×A, where P is greater than 1).

According to some embodiments, processor(s) 127 of server 120 may be configured to determine a score for the user 111*a* based at least in part on a number of instances of different types of user interactions represented by the received indications of user interactions. A score may, in some cases, be determined by applying different weightings to different types of user interactions available for a given social media platform. For example, determining a score for a social media post on a social media platform that allows "likes" and "shares" as user interactions may weight a number of "likes" and a number of "shares" differently in determining the score. Alternatively, computing device 111*b* may perform at least part of such a determination. For instance, the server 120 or social media platform 140 may send data describing indications of user interactions received from social media platform 140 to computing device 111*b*, which may compute a score for the received data. The resulting score may be, for example, sent to server 120 for storage. The data describing indications of user interactions received by computing device 111*b* in this approach may comprise the indications of user interactions generated by social media platform 140 and/or one or more summaries of the received indications.

According to some embodiments, processor(s) 127 of server 120 may be configured to determine a score based at least in part on numbers of instances of user interactions represented by indications of user interactions received from different social media platforms. A score may, in some cases, be determined by aggregating numbers of user interactions from across multiple different social media platforms. For instance, a number of "likes" and/or views of a social media post on a first social media platform may be aggregated with a number of "likes" and/or views of a social media post on a second social media platform. In some examples, such aggregation may treat the user interactions from different platforms equally and/or may apply different weightings to user interactions from different social media platforms. In some examples, such aggregation may weigh the user interactions of viewers who are also players of the game differently from user interactions of viewers that do not play the game. Such a determination may also, in some cases, also weight different types of user interactions for a given social media platform differently as discussed above. The score can be used to influence the player who created the social media post, viewers that interact with the social media post, and/or the like. For example, in-game rewards relating to social media interactions can be awarded to the player who created a given social media artifact. As another example, players of the game who interact with the social media post (e.g., view and/or "like" the post) can be rewarded (e.g., a player can get rewarded for viewing someone else's video on social media).

According to some embodiments, processor(s) 127 of server 120 may be configured to adapt video game assets 123, based on a score determined via any of the above-described techniques based on received indications of user interactions. Adapting video game assets 123 may comprise any operation by processor(s) 127 in which one or more of the video game assets 123 are modified, which may include altering data, adding data and/or removing data of the video game assets.

As a non-limiting example, adapting video game assets may include adjusting the user 111*a*'s progress within the video game (e.g., unlocking a new region, level, activity, song, and/or any other piece of content), adjusting an in-game score (e.g., increasing XP), unlocking in-game items or functions (e.g., unlocking a skin, a weapon, a new character, a new ability, and/or enabling access to other in-game items or functions), adjusting in-game currency (e.g., adding in-game money), or combinations thereof.

As examples and without limitation, suitable social media platforms as described herein may include Twitter®, Facebook®, Instagram®, Twitch®, Mixer®, Discord® or Reddit®. As referred to herein, social media platforms need not be limited to so-called social "networking" sites but may include any platform in which users may share content with other users.

Figure 2:
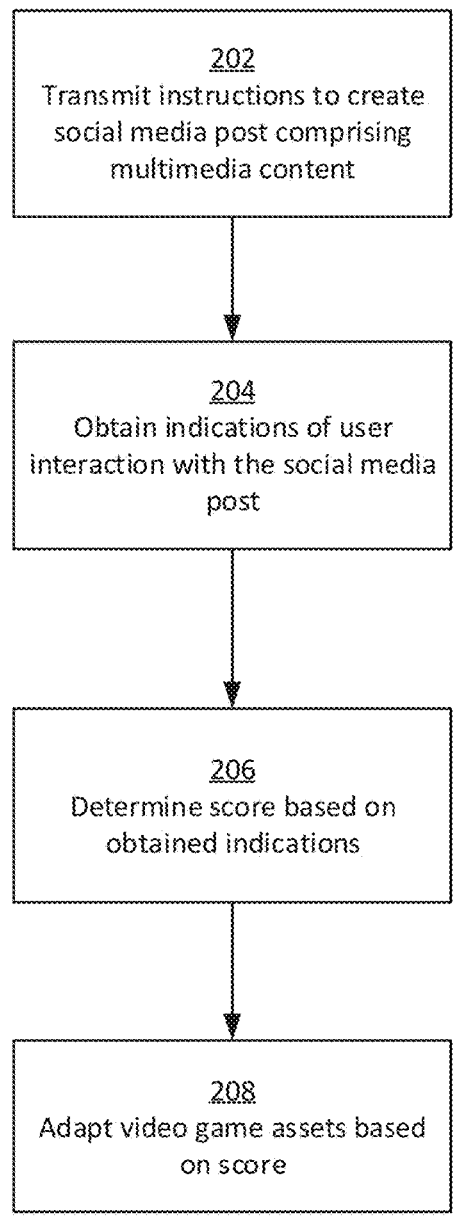
FIG. 2 is a flowchart of a method of adapting video game assets based on an aggregated measure of social media interaction, according to some embodiments.

FIG. 2 is a flowchart of a method of adapting assets of a video game of a user based on an aggregated measure of social media interaction, according to some embodiments. Method 200 may be performed by any suitable computing device or devices such as, for example, server 120 shown in FIG. 1.

In act 202, the computing device(s) performing method 200 transmits instructions to one or more social networking platforms to create a post on respective platforms in which multimedia content is shared. The multimedia content being shared relates to the video game and is created by the user. As discussed above in relation to FIG. 1, such a request may in some cases be performed by generating a suitable request message for an API of the social networking platform. As such, act 202 may in some cases comprise generating multiple request messages according to different APIs of respective social networking platforms, wherein the messages are configured to share the same multimedia content across the different platforms. As discussed above, multimedia content may comprise text, audio, images and/or video and the multimedia content of the social media post may comprise multimedia transmitted to the social media platform and/or may comprise links to multimedia hosted elsewhere.

In some embodiments, transmitting instructions to one or more social networking platforms to create a post in act 202 may comprise a user accessing a social networking platform through a conventional front end (e.g., via a user interface of a web site or application) and creating a post comprising multimedia content (or linking to such content) via conventional means. As discussed above, such a post may be identified as corresponding to a particular video game by various techniques, including by the user tagging or otherwise marking the post as being associated with the video game and/or by the social media platform assigning the post an ID (e.g., which can be reported to the game server). In this case, act 202 may be performed by a different computing device than act 204.

In act 204, the computing device(s) performing method 200 obtains indications of user interaction with one or more social media posts from corresponding social media platforms. The indications of user interaction obtained in act 204 may correspond to the social media posts for which instructions were transmitted in act 202 and/or may correspond to other social media posts previously created through instructions transmitted by the computing device(s) performing method 200 to one or more social media platforms. In either case, the indications of user interaction obtained in act 204 relate to previously shared multimedia content from the video game.

In act 206, the computing device(s) performing method 200 determines a score for the user based on the indications of user interactions obtained in act 204. As one illustrative example, FIG. 3 depicts a lookup table for scoring various types of user interactions with posts on two illustrative social networking platforms, Facebook® and Twitter®. In the example of FIG. 3, lookup table 300 indicates, for a given social media platform 310 and a type of user interaction 320 associated with that social media platform, the corresponding effect on the score for each instance of that type of interaction.

For example, in act 204 indications of the following user interactions associated with social media posts comprising multimedia associated with the video game may be received: 24 Facebook® likes, 7 Facebook® shares, 154 Twitter® likes, 22 Twitter® retweets and 9 Twitter® comments. In act 206, the computing device(s) performing method 200 may, as a result, by looking up the values 330 in lookup table 300, generate a score of 2045=(24×10)+(7×50)+(154×5)+(22×25)+(9×15). While the values 300 in the example of FIG. 3 are all positive, it will be appreciated that in general negative values may also be included in a lookup table (e.g., a downvote may decrease the determined score).

In act 208 of method 200 shown in FIG. 2, one or more video game assets for the user are adapted based on the calculated score. In cases where a video game asset being adapted relates to a numerical quantity, the numerical value may be determined according to the determined score. For example, an in-game currency may be adjusted based on the score (e.g., proportionately), so in the above illustrative use case the score of 2045 may for instance result in an in-game currency gain for the user of $2,045.

In some embodiments, act 206 may comprise determining a change in the calculated score compared with an earlier calculated score for the same social media posts, and act 208 may adapt the video game assets according to the determined change. For example, if the social media posts in the above use case were previously examined and a score of 1420 was determined, video game assets may be adapted in act 208 based on the increase of 625 in the user's score determined by comparing the newly-determined score with the previously stored score. As a result, to avoid double-counting any in-game asset changes, adaptation of said assets may, in some embodiments, be performed according to the change in the score since assets were previously adapted according to the score.

Figure 4A:
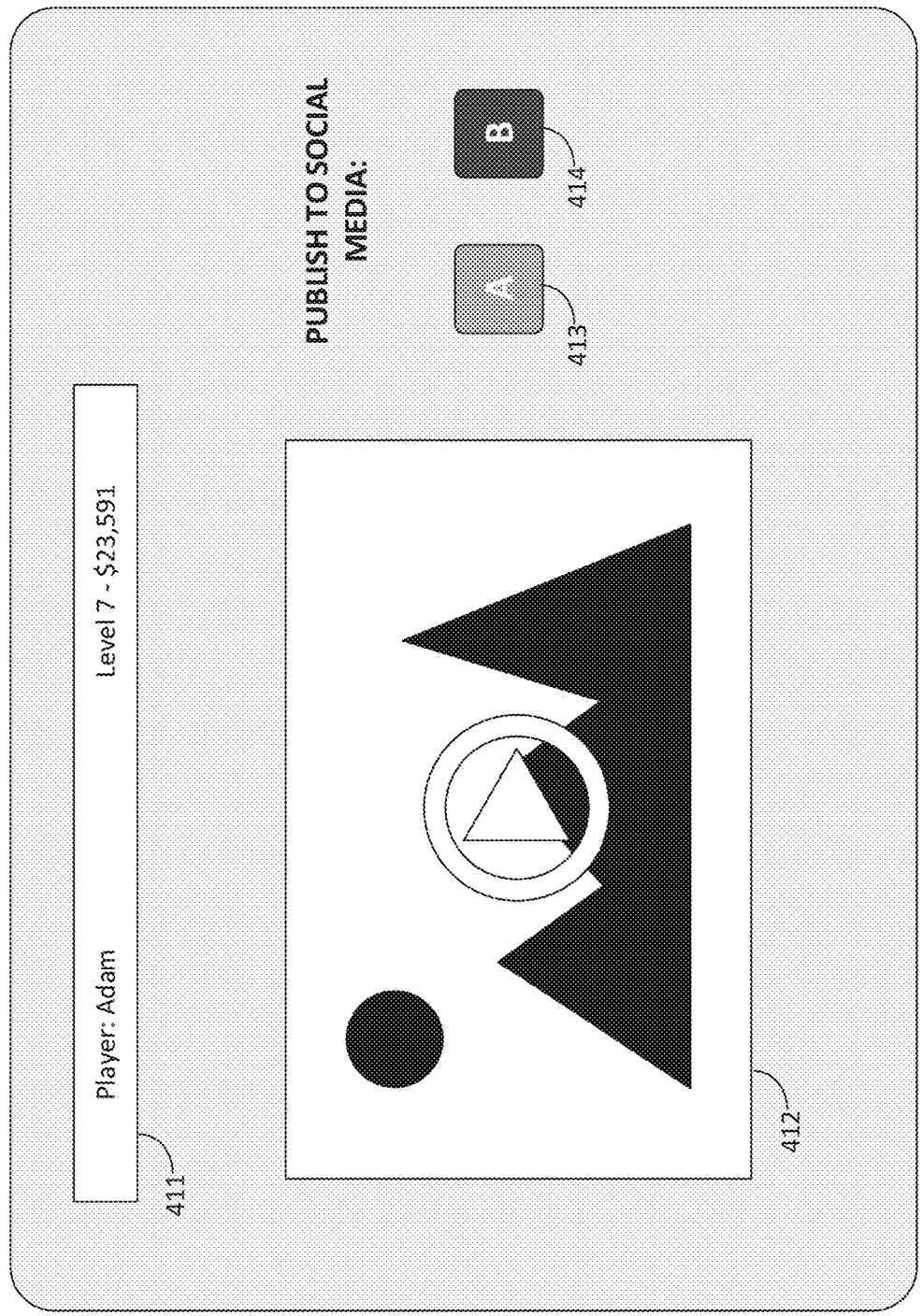
FIGS. 4A-4D depict illustrative user interfaces of a video game and a social media web site, according to some embodiments.

FIGS. 4A-4D depict a series of user interfaces to help illustrate the above-described techniques, according to some embodiments. FIG. 4A illustrates a user interface 410 for a video game in which a player named Adam has in-game currency assets of $23,591 and is a level 7 player according to info bar 411. In the example of FIG. 4A, Adam has generated a video of him obtaining a high score in the video game, which is illustrated in user interface 410 via thumbnail 412. User interface 410 includes two buttons 413 and 414, each of which, when activated, will share the video to a respective social media platform.

Figure 4B:
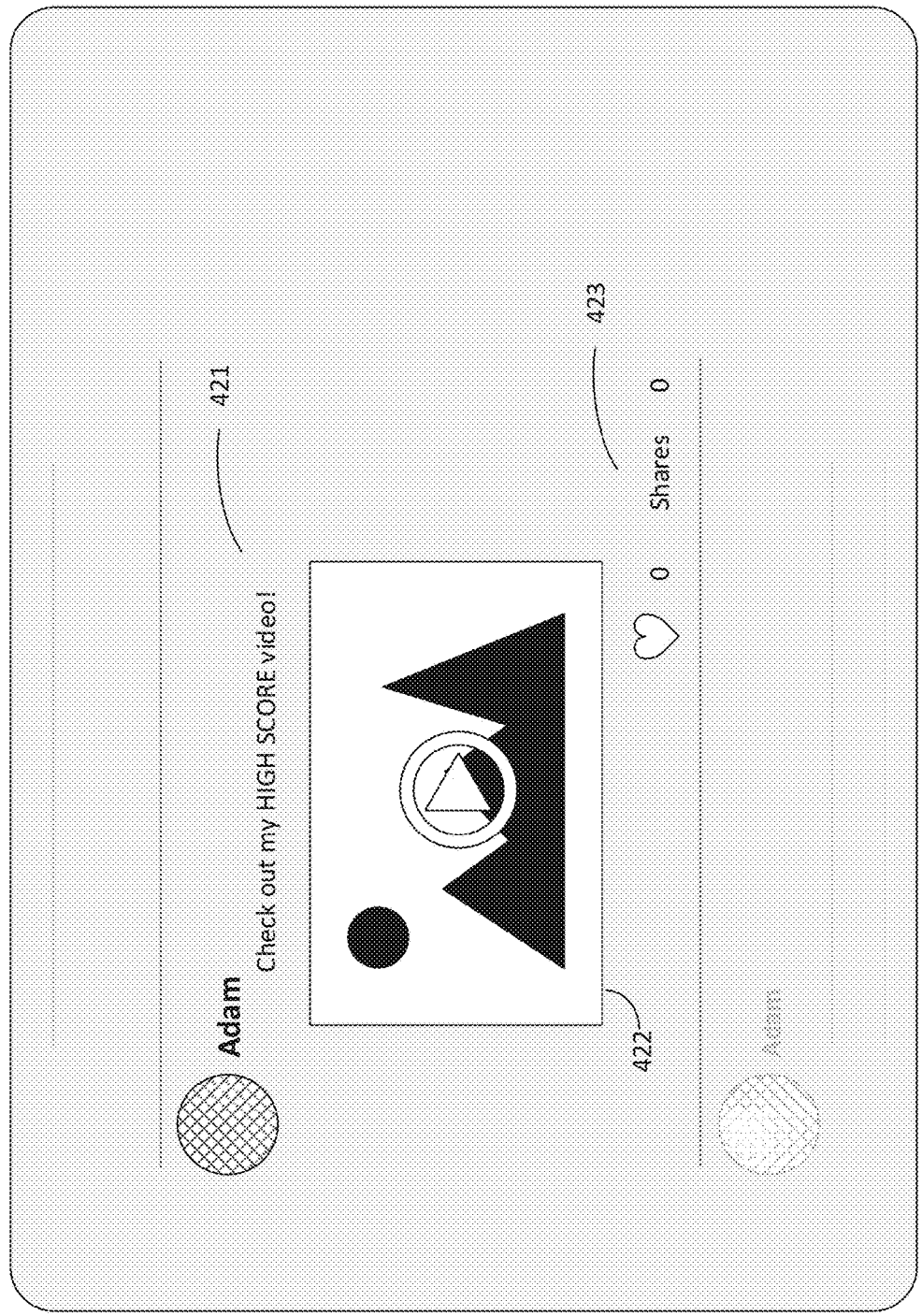
Figure 4C:
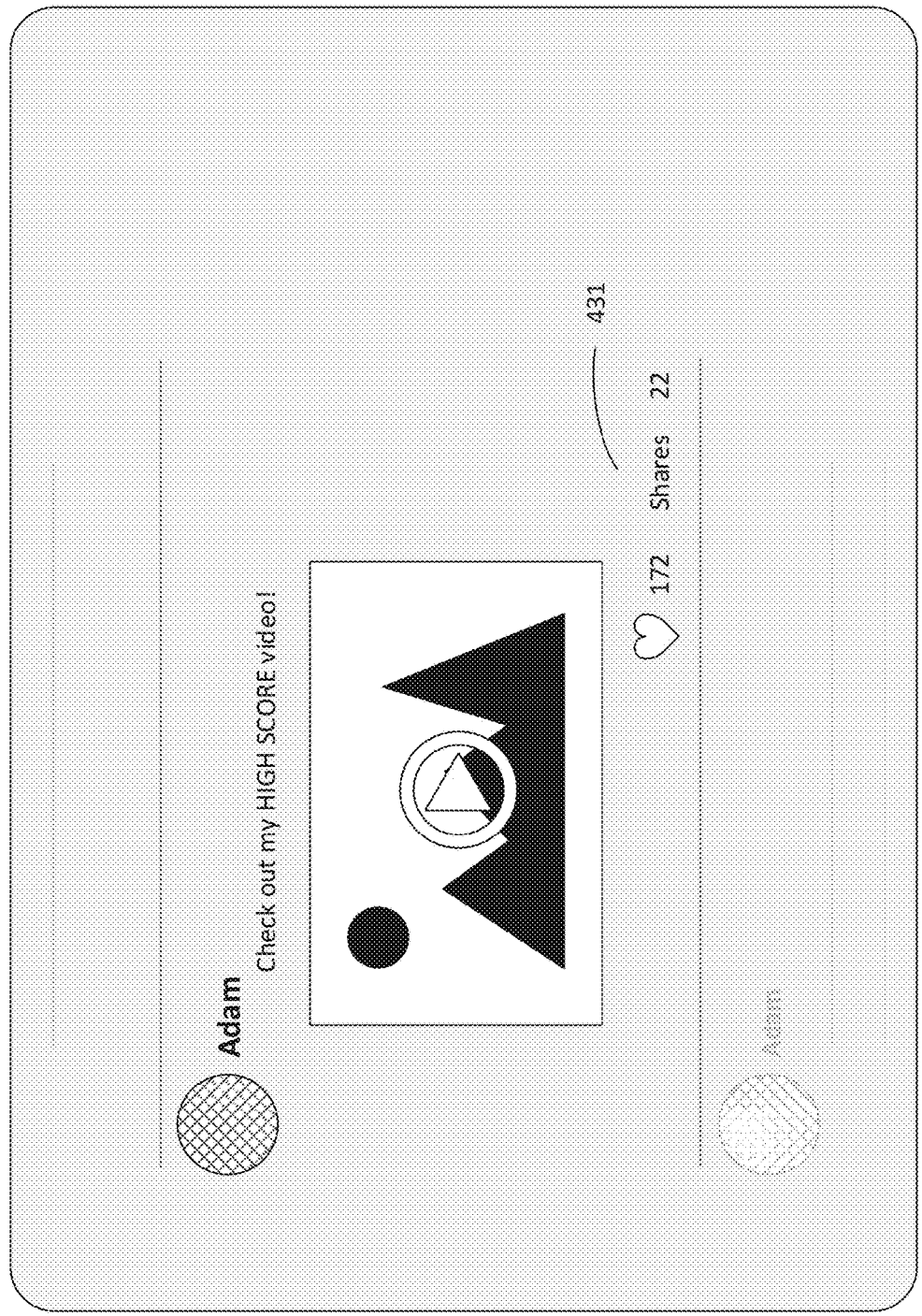

FIG. 4B depicts a user interface 420 of an illustrative social media platform's web site in which Adam has created a post of his video, which includes the text "Check out my HIGH SCORE video!" 421. The post includes a thumbnail of the video 422 which may be activated by other users of the social media platform to view the video. Immediately after creating the post, it has zero likes or shares 423. FIG. 4C depicts a user interface 430 of the illustrative social media platform's web site shown in FIG. 4B at a subsequent time after Adam's post has received a number of likes and shares 431.

Figure 4D:
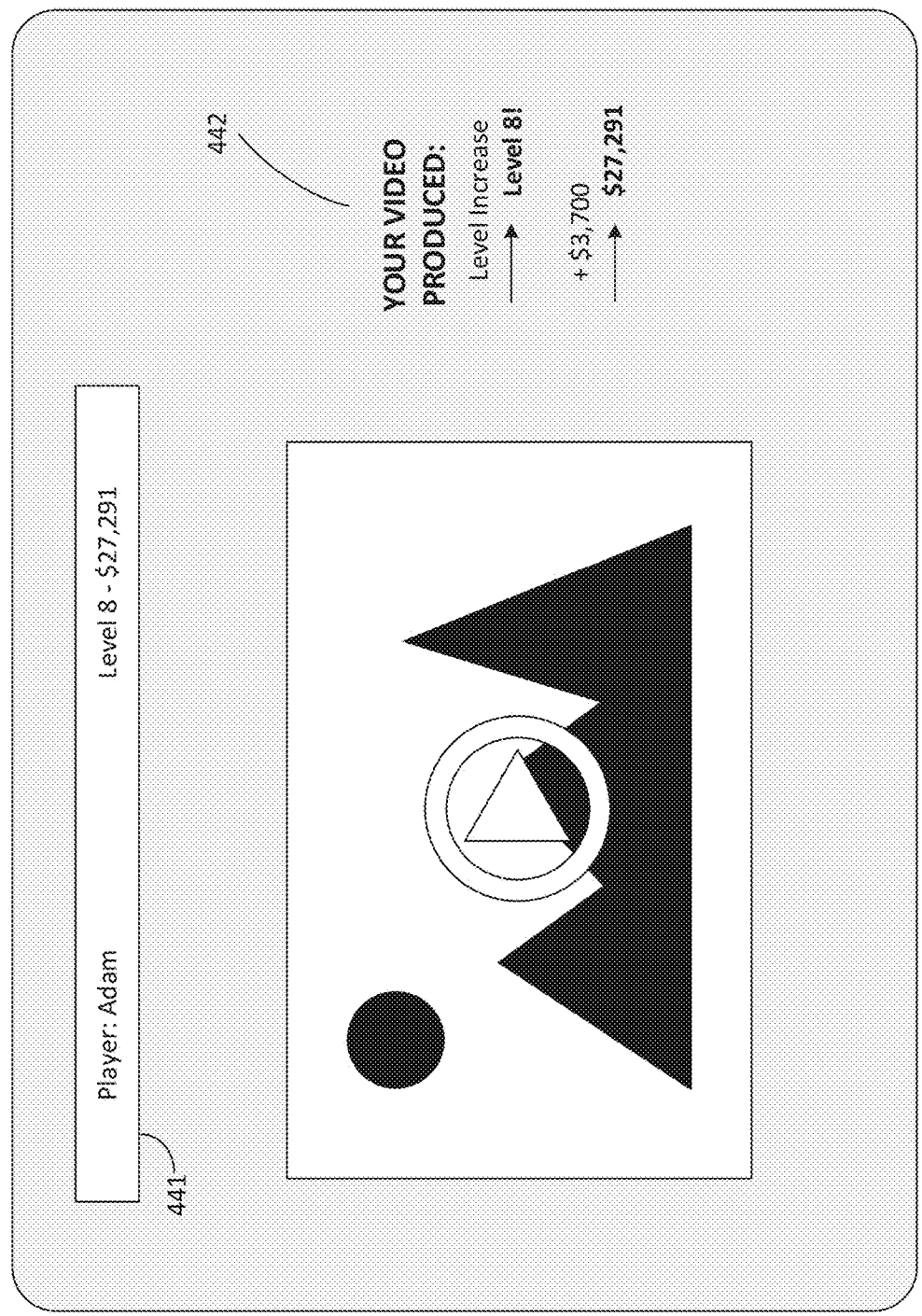

FIG. 4D illustrates a user interface 440 for the video game after assets of the video game have been adapted based on the likes and shares that Adam's post received as shown in FIG. 4C. The info bar 441 has been updated in view of the changes to Adam's in-game assets in which he received $3,700 of in-game currency and sufficient experience points (XP) to increase his level to level 8. It will be appreciated that these changes may be solely the result of the likes and shares that Adam's post received through the social media platform shown in FIG. 4C, or may be the result of aggregating the likes and shares that Adam's post received through the social media platform shown in FIG. 4C along with user interactions with another post that Adam made relating to the same video on a different social media platform.

Figure 5:
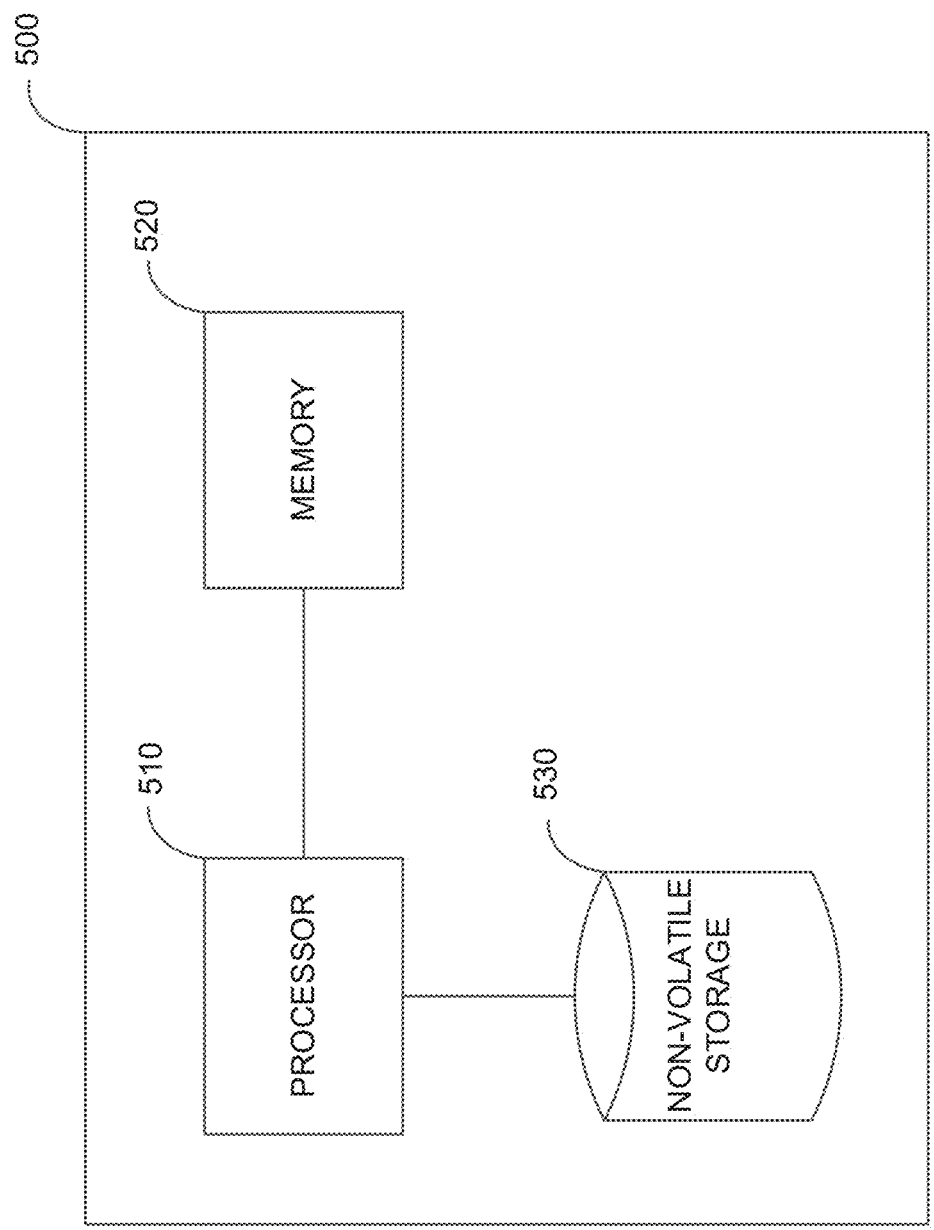
FIG. 5 illustrates an example of a computing system environment on which aspects of the invention may be implemented.

An illustrative implementation of a computer system 500 that may be used to perform any of the aspects of adapting video game assets based on an aggregated measure of social media interaction is shown in FIG. 5. The computer system 500 may include one or more processors 510 and one or more non-transitory computer-readable storage media (e.g., memory 520 and one or more non-volatile storage media 530). The processor 510 may control writing data to and reading data from the memory 520 and the non-volatile storage device 530 in any suitable manner, as the aspects of the invention described herein are not limited in this respect. To perform functionality and/or techniques described herein, the processor 510 may execute one or more instructions stored in one or more computer-readable storage media (e.g., the memory 520, storage media, etc.), which may serve as non-transitory computer-readable storage media storing instructions for execution by the processor 510.

In connection with techniques described herein, code used to, for example, generate request messages according to an API of a social media platform, transmit request messages, generate multimedia content for a video game, execute components of a video game, calculate a score based on received indications of user interactions, adapt video game assets based on a calculated score, etc. may be stored on one or more computer-readable storage media of computer system 500. Processor 510 may execute any such code to provide any techniques for adapting video game assets based on an aggregated measure of social media interaction as described herein. Any other software, programs or instructions described herein may also be stored and executed by computer system 500. It will be appreciated that computer code may be applied to any aspects of methods and techniques described herein. For example, computer code may be applied to interact with an operating system to transmit request messages or encode video or audio through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

The invention claimed is:

1. A computer-implemented method of adapting a video game based on social media interaction, the method comprising using at least one computer hardware processor to perform:
   sending, to a computing device associated with a social media platform, instructions to create a social media post in a social media platform, the social media post comprising at least one piece of multimedia content relating to a video game, the at least one piece of multimedia content produced by a player of the video game;
   receiving, from the computing device, data indicative of user interaction with the social media post, wherein the user interaction with the social media post comprises an action tracked by the social media platform; and
   determining a score for the player based at least in part on a type of the action tracked by the social media platform indicated by the received data, wherein the type is one of a plurality of different types of possible interactions with the social media post.

2. The computer-implemented method of claim 1, wherein the type comprises a like of the social media post, a share of the social media post, a retweet of the social media post, a comment of the social media post, or some combination thereof.

3. The computer-implemented method of claim 1, wherein determining the score comprises determining the score based on the type of the action and a number of occurrences of the action.

4. The computer-implemented method of claim 1, further comprising:
receiving, from the computing device, second data indicative of second user interaction with the social media post, wherein the user interaction with the social media post comprises a second type of a second action tracked by the social media platform that is different than the type of the action; and
determining the score for the player comprises determining the score based at least in part on:
the type of the action tracked by the social media platform indicated by the received data; and
the second type of the second action tracked by the social media platform.

5. The computer-implemented method of claim 4, wherein determining the score comprises:
weighting the type of the action according to a first weight; and
weighting the second type of the second action according to a second weight that is different than the first weight.

6. The computer-implemented method of claim 5, wherein determining the score comprises:
weighting a first number of occurrences of the action according to the first weight; and
weighting a second number of occurrences of the second action according to the second weight.

7. The computer-implemented method of claim 1, further comprising modifying an aspect of gameplay within the video game for the player based at least in part on the determined score for the player.

8. The computer-implemented method of claim 7, wherein modifying the aspect of gameplay within the video game comprises:
generating, based on the received data indicative of user interaction with the social media post, a request to modify an account associated with the player of the video game to adapt one or more assets within the video game based on the score; and
transmitting the request to one or more second computing devices associated with the video game.

9. The computer-implemented method of claim 8, wherein the one or more second computing devices associated with the video game comprise a video game server providing one or more aspects of the video game.

10. The computer-implemented method of claim 7, wherein modifying the aspect of gameplay within the video game comprises modifying an account associated with the player to adapt one or more assets within the video game.

11. The computer-implemented method of claim 1, further comprising:
receiving, from the computing device associated with the social media platform, second data indicative of one or more second indications of user interaction with the social media post; and
wherein determining the score for the player comprises determining the score for the player based at least in part on:
the received data indicative of the user interaction with the social media post; and
the received second data indicative of the one or more second indications of user interaction with the social media post.

12. The computer-implemented method of claim 1, further comprising:
sending, to a second computing device associated with a second social media platform, second instructions to create a second social media post comprising the at least one piece of multimedia content relating to the video game;
receiving, from the second computing device, second data indicative of one or more indications of user interaction with the second social media post; and
wherein determining the score for the player comprises determining the score for the player based at least in part on:
the received data indicative of the user interaction with the social media post; and
the received second data indicative of one or more indications of user interaction with the second social media post.

13. An apparatus for adapting a video game based on social media interaction, the apparatus comprising a processor in communication with a memory, the processor being configured to execute instructions stored in the memory that cause the processor to perform:
sending, to a computing device associated with a social media platform, instructions to create a social media post in a social media platform, the social media post comprising at least one piece of multimedia content relating to a video game, the at least one piece of multimedia content produced by a player of the video game;
receiving, from the computing device, data indicative of user interaction with the social media post, wherein the user interaction with the social media post comprises an action tracked by the social media platform; and
determining a score for the player based at least in part on a type of the action tracked by the social media platform indicated by the received data, wherein the type is one of a plurality of different types of possible interactions with the social media post.

14. The apparatus of claim 13, wherein the type comprises a like of the social media post, a share of the social media post, a retweet of the social media post, a comment of the social media post, or some combination thereof.

15. The apparatus of claim 13, wherein determining the score comprises determining the score based on the type of the action and a number of occurrences of the action.

16. The apparatus of claim 13, wherein the instructions further cause the processor to perform:
receiving, from the computing device, second data indicative of second user interaction with the social media post, wherein the user interaction with the social media post comprises a second type of a second action tracked by the social media platform that is different than the type of the action; and
determining the score for the player comprises determining the score based at least in part on:
the type of the action tracked by the social media platform indicated by the received data; and
the second type of the second action tracked by the social media platform.

17. The apparatus of claim 16, wherein determining the score comprises:
   weighting the type of the action according to a first weight; and
   weighting the second type of the second action according to a second weight that is different than the first weight.

18. The apparatus of claim 17, wherein determining the score comprises:
   weighting a first number of occurrences of the action according to the first weight; and
   weighting a second number of occurrences of the second action according to the second weight.

19. The apparatus of claim 13, wherein the instructions further cause the processor to perform modifying an aspect of gameplay within the video game for the player based at least in part on the determined score for the player.

20. At least one non-transitory computer-readable storage medium storing processor-executable instructions that, when executed by at least one computer hardware processor, cause the at least one computer hardware processor to perform the acts of:
   sending, to a computing device associated with a social media platform, instructions to create a social media post in a social media platform, the social media post comprising at least one piece of multimedia content relating to a video game, the at least one piece of multimedia content produced by a player of the video game;
   receiving, from the computing device, data indicative of user interaction with the social media post, wherein the user interaction with the social media post comprises an action tracked by the social media platform; and
   determining a score for the player based at least in part on a type of the action tracked by the social media platform indicated by the received data, wherein the type is one of a plurality of different types of possible interactions with the social media post.

* * * * *